July 24, 1951  J. D. MOULTON ET AL  2,561,943
ELECTRIC BATTERY
Filed Dec. 13, 1945  2 Sheets-Sheet 2
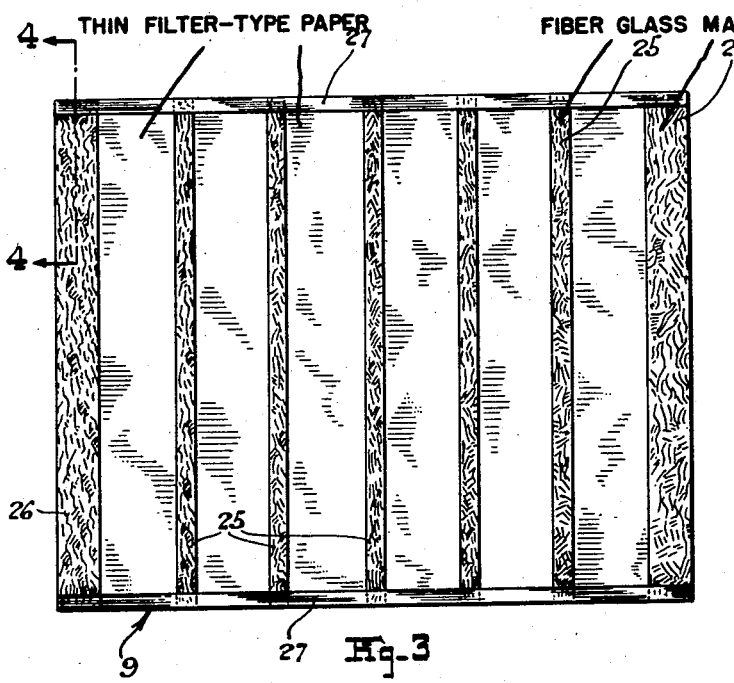
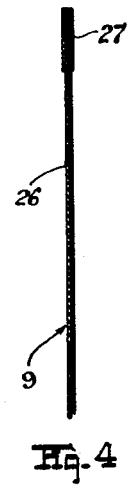
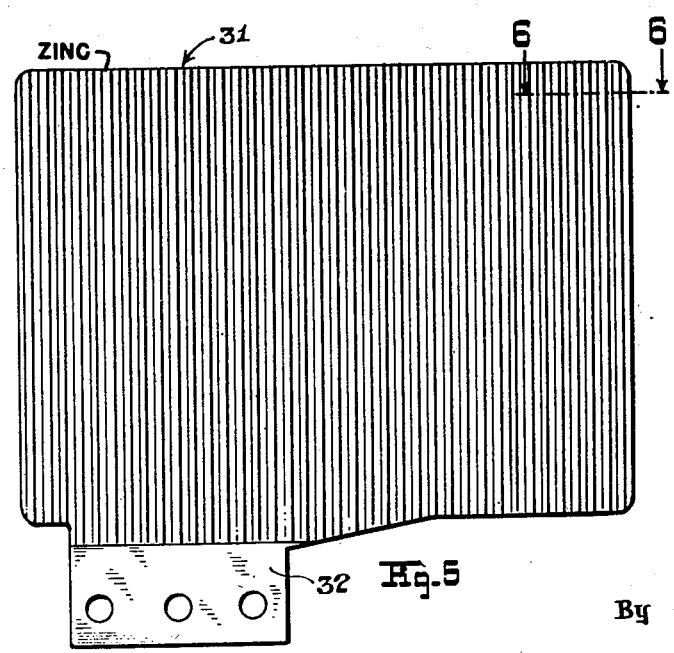
INVENTORS
Joseph Donald Moulton
Robert F. Enters
Harry F. Moufang
By Henry Lanahan
ATTORNEY Patented July 24, 1951

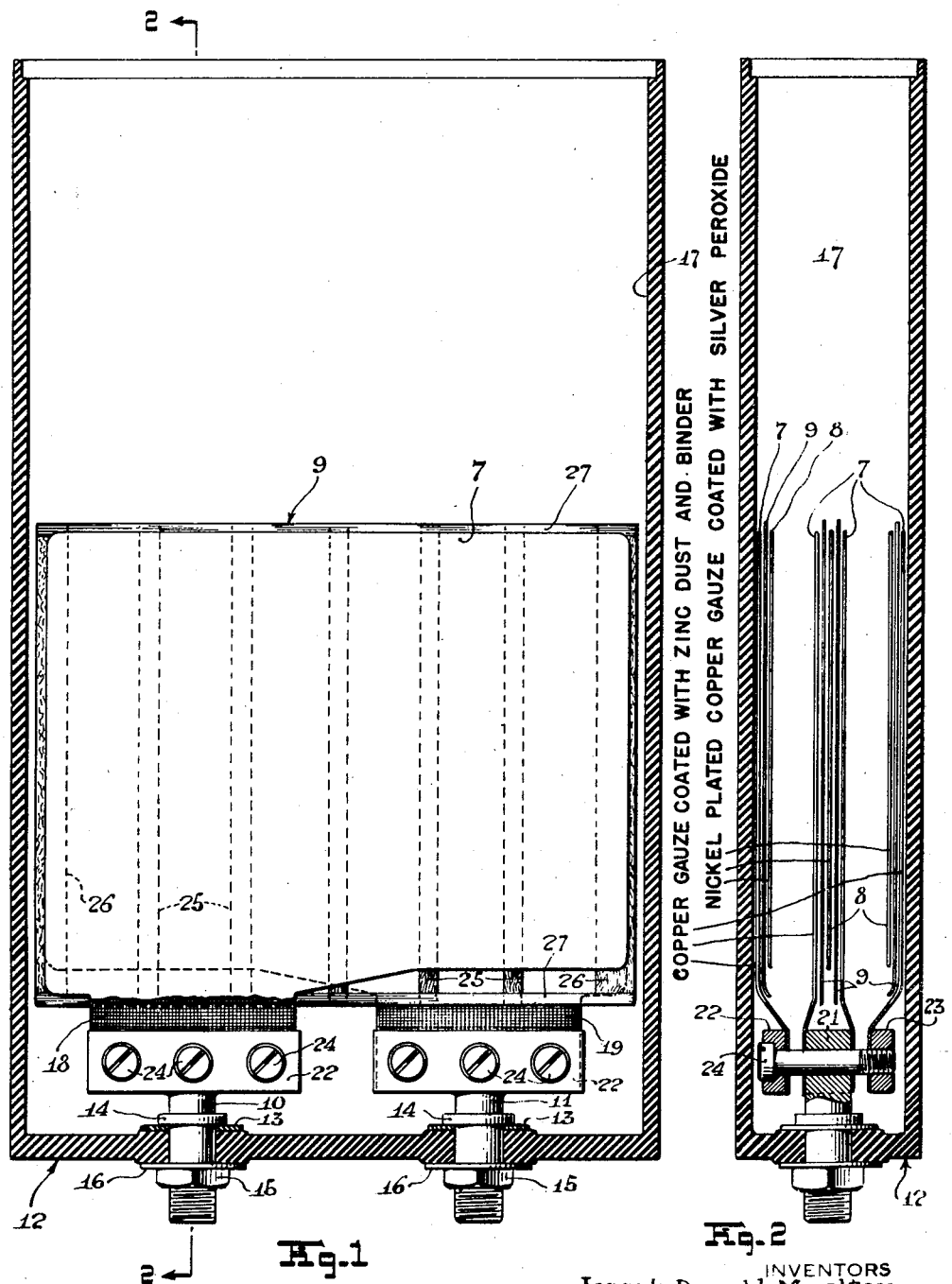

2,561,943

UNITED STATES PATENT OFFICE 2,561,943

ELECTRIC BATTERY

Joseph Donald Moulton, West Orange, Robert F. Enters, Hackensack, and Harry F. Moufang, Livingston, N. J., assignors to Thomas A. Edison, Incorporated, West Orange, N. J., a corporation of New Jersey Application December 13, 1945, Serial No. 634,822

2 Claims. (Cl. 136—106)

This invention relates generally to electric batteries and has particular reference to improvements in multi-cell primary batteries in which a liquid electrolyte is employed.

A broad object of the invention is to make it possible to provide primary batteries having very high rates of discharge per unit weight and volume, as compared with prior batteries.

Another broad object is to make possible a primary battery which will reach its full discharge rate almost instantly. This is important in view of the relatively short duration of the discharge.

These broad objects are attained by a novel construction, as an entirety, of the cell employed and an electrolyte which is almost instantaneously in intimate and effective contact with the active materials of the positive and negative electrodes.

Stated more specifically, important objects of the invention are to provide a novel positive plate and method of producing it; a novel negative plate and method of making it; a novel separator for spacing the positive and the negative plates apart; as well as the novel electrolyte previously mentioned. All of these things contribute importantly toward attaining the broad objects above stated.

As an example, a deferred-action battery of 110 series connected cells each measuring about 1⅝" thick x 6½" wide x 15" high, in which only about one-half of the height dimension is utilized for the battery plate assembly and the rest is used for storage of the electrolyte for activating the cell weighing about 13 lbs. constructed and operated according to the invention has been employed to drive a 300 kw. motor for three minutes, the current rate being approximately 2,000 amperes at 140 volts. The discharge started substantially instantaneously, reached 75% of the desired rate in about 1½ seconds and reached the full discharge rate in 3 seconds. This installation is hereinafter occasionally referred to as a 300 kw. battery.

As another example, a battery of 60 series connected cells each measuring about 1⅝" x 6½" x 11¾" weighing about 12½ lbs., employing a modified form of negative electrode, has been used to drive a 60 kw. motor, the current rate being approximately 715 amperes at approximately 84 volts discharging for eight to ten minutes. This battery is later referred to herein as a 60 kw. battery.

The invention is hereinafter explained in detail, with references to the illustrative drawings accompanying and forming a part of this specification, the novel features of the invention being pointed out in the claims appended hereto.

In said drawings:

Fig. 1 is a side elevation, with parts partly broken away, of one of the novel cells;

Fig. 2 is a partial section on the line 2—2 of Fig. 1, with parts omitted for clarity, the battery plates being shown in full except for the lug portions of the negative plates;

Fig. 3 is a side elevation of one of the novel separators;

Fig. 4 is a section along the line 4—4 of Fig. 3;

Fig. 5 is a side elevation of a modified form of negative electrode plate; and

Fig. 6 is a section on the line 6—6 of Fig. 5.

The cell illustrated in Figs. 1 to 4 of the drawing is one of the cells used in the 300 kw. battery hereinabove mentioned. That cell has 29 negatives plates 7 (Figs. 1 and 2) and 28 positive plates 8, alternating in the usual manner with separators 9 interspersed with the plates, there being a total of 56 separators employed. The complete assembly of plates and separators has a total thickness of approximately 1½". The negative and the positive plates are respectively connected to pole pieces 10 and 11 extending through the bottom wall of the cell container or casing 12. Gaskets 13 serve as seals to prevent escape of the electrolyte from the container. Flanges 14 on the pole pieces, nuts 15 and washers 16 serve to compress the gaskets 13 to render the seal effective. The wall of the container extends well above the tops of the separators and electrode plates to provide a receptacle 17 into which the electrolyte is dumped or flooded when the cell is put into use. It should be stated here that the cells are assembled and the desired number of cells connected up to make a battery of the desired capacity and kept in a dry or unfilled state until the battery is to be started, that being effected simply by dumping or flooding the electrolyte into the containers.

The negative plates each comprises a copper wire gauze grid which supports the active material. The gauze is 45 x 45 mesh and woven of 0.0065" copper wire and then pressed between platens to give a thickness of from 0.007" to 0.009", the compression, of course, effecting mainly the points where the wires are crossed in the gauze. The active material for the negative plates is carried by the copper gauze. It may be a paste of finely divided zinc and water, the water carrying enough of a binder to hold the zinc in place on the grids after the paste has dried. It is preferred, however, to use the finely divided zinc in the form of a dust or powder with which has been thoroughly dry mixed an amount of aluminum powder which may be varied but should be equivalent to between about 0.01% and 1% by weight of the zinc. After thoroughly mixing the zinc and aluminum enough water containing a binder is added and stirred in to produce a paste. The binder should be one which is soluble in contact with water and some vegetable gums appear to be best suited for the purpose. One binder which has proved entirely satisfactory is an alkali treated vegetable gum known on the market as Ondulum, manufactured by Glyco Products Company, New York city. Ondulum as marketed is a dry vegetable gum powder. The solution used is prepared by adding about 450 ml. of boiling distilled water to 21.5 grams of the powder, and, after mixing for 20 minutes in a mechanical stirrer, making the cooled solution up to 500 ml. with distilled water. Binder equivalent to about 1% by weight of the zinc is added in the form of this solution to prepare the paste.

After the paste has been mixed it is applied to the pressed gauze with a spatula or brush so as to cover the gauze to the desired thickness and the plate is then oven dried at 85° C. for an hour and stored for future use. A plate properly coated for use in the 300 kw. battery will show a maximum and substantially uniform thickness of 0.013". Such plates have a surface area of approximately 38.3 square inches and will, when completed, contain from 14 to 16 grams of the active material.

The negative plates without aluminum powder, as above described, are not claimed herein since the same are the subject of a divisional application Serial No. 210,093 filed February 8, 1951.

The positive plates are constructed of the same copper wire gauze as is employed in constructing the negative plates but before the gauze is pressed it is coated with nickel. The amount of nickel is rather critical and where the gauze is of the mesh and wire size described above should be kept between about 0.021 and about 0.065 gram of nickel per square inch of gauze. A thickness of about 0.0002" is satisfactory. If less nickel than the minimum stated is used the nickel is likely to alloy with the copper during the sintering process hereinafter described, with the result that the nickel will fail to protect the copper against corrosion in a re-oxidizing operation which is also subsequently described. If the nickel plating is thicker than the maximum stated there is a possibility that discharge voltages will be lowered due to the higher resistance of nickel.

After the wire gauze grid has been nickel plated and pressed it is loaded with silver oxide ($Ag_2O$). A loading weight of $Ag_2O$ equivalent to 0.395 gram of silver per square inch of plate area gives satisfactory results. The plate area is, like the area of the negative plate, approximately 38.3 square inches (6⅛" x 6⅜"). In loading the positive plates, silver oxide powder is mixed with a sufficient water to produce a paste which is applied to the gauze by a spatula or in any other suitable way. After the paste is applied the plate is given a preliminary drying in an oven at 85° C. for 15 minutes and is then sintered in a muffle furnace at 450° to 480° C. for about 10 minutes. The preliminary drying may be varied as, for example, at a lower temperature for a longer time. The sintering may also be varied, as temperatures up to 600° C. may be employed, but the temperatures should not exceed 480° C. if the nickel plating on the copper gauze is near the above mentioned minimum of 0.021 gram per square inch. After the sintering operation the active material, which is considered to be all metallic silver at this stage, amounts to about 14 to 16 grams for the plate area of 38.3 square inches.

The sintered plates are then pressed between flat faced platens at about 23 tons pressure. This pressure densifies the silver and develops satisfactory electrical characteristics in it, while maintaining a part of the porosity which the silver had before the pressing. If the pressure is too high the porosity of the silver will be destroyed and a reoxidizing operation hereinafter mentioned will be handicapped or possibly made completely ineffective. One effect of the pressing operation is that in densifying the silver it is forced into intimate contact with the wire gauze so that the gauze affords a firm support for the silver.

The metallic silver is then converted into a peroxide of silver. This is accomplished by electrolyzing the silver plates anodically in a 5% KOH solution against nickel steel cathodes for about 16 hours at 1 ampere per plate. The concentration of the KOH solution may vary from 5% to 25% and the electrolization may otherwise vary; for example, it may continue for three hours at 6 amperes per plate. After the plate has been electrolyzed as described, substantially all the metallic silver will have been converted into $Ag_2O_2$. The plate is then washed in running water, care being used not to continue the washing too long for fear of leaving a calcium or magnesium deposit on the plate, either of which would be injurious to the negative plates when the cell is discharged. The plates are then dried and set aside until needed.

The method of making the positive plates, abovedescribed, is not claimed herein since the same is the subject of a divisional application Serial No. 176,544, filed July 28, 1950.

The copper gauze grids for the negative plates are so cut or formed as to leave ears 18 extending from their lower margins and the gauze grids for the positive plates are so cut or shaped as to leave similar ears 19 projecting from their lower edges. In assembling a cell all of the ears 18 are connected to the pole piece 10. The ears are divided into two substantially equal groups as illustrated diagrammatically in Fig. 2 with a bar 21 rigid with or forming part of the pole piece between the groups. Clamping plates 22 and 23 cooperate with the bar 21, screws 24 passing through the plate 22 and threaded into the clamping plate 23 serving to draw the plates together and press all of the ears 18 into close electrical contact. A similar arrangement serves to connect all of the ears 19 of the positive plates to the pole piece or terminal 11. This arrangement, of course, makes it possible to alternate the negative and the positive plates in assembling and properly connect them to the separate pole pieces.

Between the plates are the separators 9. These separators each consist of a thin paper which can be fairly described as being of the filter type. There are papers on the market which are suitable for the purpose, among them being Manaya paper supplied by George W. Millar Co., and Aldex 14 pound paper manufactured by Aldine Paper Company. These papers, like the other desirable ones, are about 0.003" thick. In making a separator a sheet of one of the papers mentioned is cut to a size slightly larger than the main faces of the positive and negative plates, the object being, of course, to have the separator extend slightly beyond the edges of the electrode plates as shown in Fig. 1. After cutting the paper to size, strips 25 and 26 of a glass fiber mat about 0.010" thick are placed across one face of the paper and are secured to the paper at their ends only in any suitable way. In Figs. 3 and 4 the attachment is shown as effected by strips 27 of cellophane or similar material backed by a heat sensitive adhesive which is applied across the end of the sheet of paper and the ends of the strips 25 and 26 in such a way as to secure the ends of the strips to the paper.

When assembled in a cell these separators, which space the plates 0.013" apart, provide channels for the entrance of the electrolyte between the plates. That is the main purpose of the glass mat strips. Those strips should always face the negative plates. That is to say, the separators are so arranged that there is a set of the glass mat strips in contact with each side of each negative plate. The glass mat strips 26 are wider than the strips 25, the purpose of the added width being mainly to serve as a reinforcement preventing displacement of the edges of the paper.

After the electrode plates and separators have been assembled as described the cell is ready for use. When the battery is to be put into play the entire supply of electrolyte is, as before suggested, dumped into the upper part 17 of the container. The discharge of current begins as soon as the electrolyte establishes a circuit between one or more pairs of positive and negative plates but because of the manner of applying the electrolyte complete circuits between all faces are established almost instantaneously. The electrolyte employed is a solution of KOH. The concentration may vary from about 21% to about 45% according to the construction of the cell and the effect desired. In the 300 kw. battery a 25% solution of KOH was found to be very satisfactory, although solutions ranging from 21% to 35% were successfully used.

In order to effect quick starting of the discharge the electrolyte should make quick and intimate contact with the faces of the active materials on the negative and positive plates. To accomplish this the electrolyte contains a wetting agent. There are a number of satisfactory wetting agents on the market, one of which is Mercerizing Penetrant 790I Aero Brand marketed by American Cyanamid and Chemical Corporation. This is a cresylic type of penetrant used by textile mills in mercerizing baths. It has been found to be quite effective in assisting in the quick filling of the cell notwithstanding the closely packed electrodes and separators in addition to performing its function in establishing quick and intimate contact of the electrolyte with the surfaces of the active materials.

When the cell is connected to an outside circuit and the electrolyte is dumped into the upper part 17 of the cell container or casing and the cell begins to discharge, the reaction at the positive plates proceeds as a reduction of silver peroxide to silver oxide to metallic silver, while at the negative plates metallic zinc is oxidized to zinc oxide which is quickly soluble in the potassium hydroxide electrolyte as a zincate. This is important, as it is necessary that the zinc oxidized be removed from the negative electrode substantially as fast as developed in order that additional metallic zinc may be oxidized. Further, if the electrolyte is permitted to approach the saturation point with respect to zinc oxide, particularly if the rate of formation of zinc oxide is high, the electrochemical action may "shut off" before the full utilization of the silver electrode can be realized. The reactions may be written thus: The cell reaction is $$Ag_2O_2 + 4KOH + 2Zn \rightarrow 2Ag + 2K_2ZnO_2 + 2H_2O$$

the reactions at the positive electrode are (1) $\qquad Ag_2O_2 + 2\ominus \rightarrow Ag_2O + O^=$ (2) $\qquad Ag_2O + 2\ominus \rightarrow 2Ag + O^=$ and the reaction at the negative electrode:

$$2Zn + 4KOH - 4\ominus \rightarrow 2K_2ZnO_2 + 4H^+$$

Because of the relatively thin plate construction, these reactions proceed nearly to completion giving good utilization in spite of the extremely high rates of discharge. The thin plate construction, which allows the usage of a large number of plates in a given cell space, results in abnormally large surface areas over which the discharge rate may be distributed, thus reducing the current density per unit area to a point where useful voltages are realized for substantially the entire period of the reactions.

The 60 kw. battery cell previously mentioned is substantially the same as has just been described, one difference being that instead of the finely divided zinc bound on a copper grid, the negative plates are cut from sheets of substantially pure zinc, the sheets preferably having a thickness of about 0.006". In order to produce uniform reactivity over substantially the whole area of the plates they are cathodically cleaned free of greasy deposits in an alkaline cleaning bath and then etched to a uniform matt finish in properly diluted mineral acid. The plates may, if desired, be corrugated vertically by pressing them between a platen having a corrugated face and a rubber backing block, the result being illustrated in Figs. 5 and 6 of the patent drawings. The overall thickness of the corrugated sheet will, of course, depend upon the depths of the corrugations. They may give an over-all thickness of .013" for the plate although this overall thickness, as well as the thickness of the sheet stock and the depths of the corrugations may be varied as desired. In one instance the over-all thickness was 0.020". The corrugations have the effect, among other things, of increasing the total area of zinc exposed to the electrolyte as well as providing channels permitting ready access of the electrolyte to the plate surface. Sheet zinc plates are suitable for use only at lower discharge current densities per unit area than where the finely divided zinc is used. The difference in the discharge rate between the 300 kw. battery cell and the 60 kw. battery cell, with only small differences in plate areas, makes it possible to use the sheet zinc negative plates which are simpler to make and have improved starting characteristics. It is possible to use a higher concentration of KOH in the electrolyte for the 60 kw. cell, a 35% solution having been found to give very satisfactory results. Each of the sheet zinc negative plates has an uncorrugated portion or ear 32 by which the plates may be clamped in position between the bars 22 and 23 in assembling the cell.

In assembling cells for various purposes negative plates have been made of sheet zinc of thicknesses from about 0.006" to about 0.030", cleaned and etched, either flat or corrugated, or of the pasted finely divided zinc type on nickel plated copper, iron or Monel metal gauze grids of thicknesses ranging from about 0.007" to about 0.030". In some instances varying proportions of two types of negative plates, such as the sheet zinc type and the pasted type, have been used in the same cell according to the rates of discharge and the electrochemical characteristics desired of the battery. The concentration of the electrolyte has been varied from 21% to 45% for the same purposes, in some cases using sodium, potassium, or lithium hydroxides or even combinations of these alkalies and the concentration of the wetting agent has been varied up to about 1% by volume. The positive plates have been pasted with silver oxide equivalent to about 0.3 gram to about 1 gram of silver per square inch of plate area on nickel plated copper, nickel plated iron or Monel metal gauze grids of thicknesses ranging from about 0.007" to 0.020"; and sintering temperatures have been used on these plates of varying thicknesses of from about 300° C. to about 600° C. Separators have been varied to include single or multiple sheets of thin permeable papers ranging in thicknesses from 0.002" to 0.007" used either alone or with spacers consisting of strips or cut-out sheets of fiber glass matting in thicknesses ranging from 0.005" to 0.025", separate from or attached to marginal portions of the paper.

The above variations, with others which will be apparent to those skilled in the art, make it possible to adapt the cells to a great many uses where different or varying rates of discharge are desirable. Therefore, while the detailed explanation has referred mainly to the 300 kw. type of cell and the 60 kw. type of cell, those are to be considered only as representative or illustrative embodiments of the inventions included in the following claims.

What is claimed is:

1. A negative plate for use in a battery cell which comprises a metallic wire gauze grid supporting the active material, said material consisting of finely divided zinc and an amount of aluminum powder mixed with the zinc equivalent to between about 0.01% and 1% by weight of the zinc, and a water soluble binder holding said aluminum and zinc in place on the grid.

2. A negative plate for use in a battery cell which comprises a copper wire gauze grid between about 0.007" and 0.020" thick covered with sufficient active material to give a total thickness for the plate of between about 0.010" and 0.030", said active material comprising zinc with which has been incorporated an amount of aluminum equivalent to between about 0.01% and 1% by weight of the zinc.

JOSEPH DONALD MOULTON.
ROBERT F. ENTERS.
HARRY F. MOUFANG.

REFERENCES CITED

The following references are of record in the file of this patent:

UNITED STATES PATENTS

| Number | Name | Date |
|---|---|---|
| Re. 16,548 | Waddell | Feb. 8, 1927 |
| 303,237 | Skrivanow | Aug. 5, 1884 |
| 403,451 | Barrett | May 14, 1889 |
| 555,304 | Crowdus | Feb. 25, 1896 |
| 680,848 | Erny | Aug. 20, 1901 |
| 692,298 | Jungner | Feb. 4, 1902 |
| 764,813 | Kemperdyk | July 12, 1904 |
| 793,078 | Hubbell | June 27, 1905 |
| 1,051,261 | Ricks | Jan. 21, 1913 |
| 1,380,770 | Carpenter | June 7, 1921 |
| 1,416,738 | Muren | May 23, 1922 |
| 1,451,758 | Breyer et al. | Apr. 17, 1923 |
| 1,665,604 | Norris et al. | Apr. 10, 1928 |
| 2,049,201 | Dunzweiler et al | July 28, 1936 |
| 2,251,913 | Brennan | Aug. 12, 1941 |
| 2,317,711 | Andre | Apr. 27, 1943 |
| 2,344,614 | Hulse | Mar. 21, 1944 |
| 2,428,850 | Lawson | Oct. 14, 1947 |
| 2,433,024 | Burgess | Dec. 23, 1947 |